(12) United States Patent
Yabuta et al.

(10) Patent No.: US 9,486,779 B2
(45) Date of Patent: Nov. 8, 2016

(54) GLASS ARTICLE PROVIDED WITH PHOTOCATALYST FILM

(71) Applicant: Nippon Sheet Glass Company, Limited, Tokyo (JP)

(72) Inventors: Takeshi Yabuta, Tokyo (JP); Fumiyoshi Kondo, Tokyo (JP); Mitsuhiro Kawazu, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/375,638

(22) PCT Filed: Feb. 1, 2013

(86) PCT No.: PCT/JP2013/000575
§ 371 (c)(1),
(2) Date: Jul. 30, 2014

(87) PCT Pub. No.: WO2013/114894
PCT Pub. Date: Aug. 8, 2013

(65) Prior Publication Data
US 2015/0004398 A1 Jan. 1, 2015

(30) Foreign Application Priority Data
Feb. 3, 2012 (JP) ................. 2012-021905

(51) Int. Cl.
| | |
|---|---|
| *B01J 21/08* | (2006.01) |
| *G02B 27/00* | (2006.01) |
| *C03C 17/00* | (2006.01) |
| *B01J 35/00* | (2006.01) |
| *C03C 17/23* | (2006.01) |
| *B01J 37/02* | (2006.01) |
| *B01J 21/06* | (2006.01) |
| *B01J 35/02* | (2006.01) |

(52) U.S. Cl.
CPC ............ *B01J 21/08* (2013.01); *B01J 35/004* (2013.01); *B01J 35/0013* (2013.01); *C03C 17/007* (2013.01); *C03C 17/23* (2013.01); *G02B 27/0006* (2013.01); *B01J 21/063* (2013.01); *B01J 35/002* (2013.01); *B01J 35/023* (2013.01); *B01J 37/0219* (2013.01); *C03C 2217/42* (2013.01); *C03C 2217/45* (2013.01); *C03C 2217/477* (2013.01); *C03C 2217/478* (2013.01); *C03C 2217/48* (2013.01); *C03C 2217/71* (2013.01); *Y10T 428/256* (2015.01)

(58) Field of Classification Search
None
See application file for complete search history.

(56) References Cited

U.S. PATENT DOCUMENTS

| | | | |
|---|---|---|---|
| 8,541,106 B2 | 9/2013 | Yabuta et al. | |
| 2003/0186089 A1 | 10/2003 | Kikuchi et al. | |
| 2012/0148832 A1* | 6/2012 | Yabuta | B01J 21/063 428/331 |

FOREIGN PATENT DOCUMENTS

| | | |
|---|---|---|
| JP | 9-262483 | 10/1997 |
| JP | 2001-264509 | 9/2001 |
| JP | 2001-295026 | 10/2001 |
| JP | 2003-287601 | 10/2003 |
| JP | 2005-352303 | 12/2005 |
| JP | 2008-040171 | 2/2008 |
| WO | 2011/021383 | 2/2011 |

* cited by examiner

*Primary Examiner* — Cheng Huang
(74) *Attorney, Agent, or Firm* — Hamre, Schumann, Mueller & Larson, P.C.

(57) ABSTRACT

The present invention provides a glass article including a photocatalyst film 1 containing silicon oxide particles 6 and titanium oxide particles 5, and a glass sheet 2. Assuming that the photocatalyst film 1 has a film thickness T, 80% or more of the titanium oxide particles are localized in a region between a surface of the glass sheet 2 and a position spaced from the surface by 0.6 T toward a surface of the photocatalyst film 1 in a thickness direction of the photocatalyst film 1. The glass article has an increased transmittance provided by enhancing the reflection-reducing function of the photocatalyst film 1 while maintaining the film strength and photocatalytic function of the photocatalyst film 1.

6 Claims, 7 Drawing Sheets

GLASS ARTICLE PROVIDED WITH PHOTOCATALYST FILM

TECHNICAL FIELD

The present invention relates to a glass article including a glass sheet and a photocatalyst film. More particularly, the present invention relates to improvement of a photocatalyst film having a photocatalytic function and a light reflection-reducing function. cl BACKGROUND ART Glass sheets utilizing the photocatalytic function exerted by titanium oxide films are manufactured and commercially sold as so-called "self-cleaning glass". As is well known, the photocatalytic function of titanium oxide films causes decomposition of organic substances adhered to the surfaces of glass sheets and thereby weakening of the adhesiveness of the organic substances, thus allowing the organic substances to be washed away by rainwater or the like.

The refractive index of titanium oxide (about 2.5 in the case of the anatase type) is higher than the refractive index of glass. For this reason, the formation of a titanium oxide film on a surface of a glass sheet increases the light reflectance of the glass sheet. Therefore, in view of uses for which increase in light reflectance is not desired (e.g., uses in solar cells or greenhouses), a photocatalyst film capable of suppressing the increase in light reflectance has been proposed. In this photocatalyst film, the refractive index of the film is decreased by having the film contain not only titanium oxide particles but also particles of silicon oxide having a lower refractive index than titanium oxide. A sufficient decrease in the refractive index of the photocatalyst film allows a decrease in reflectance of light incident on the glass sheet.

WO 2011/021383 A1 (Patent Literature 1) discloses a glass article including a glass sheet and a photocatalyst film formed on a surface of the glass sheet, the glass article being an improved glass article made suitable for long-term use by enhancing the film strength of the photocatalyst film while maintaining the photocatalytic function and the reflection-reducing function of the photocatalyst film.

As shown in FIG. 11, in a photocatalyst film 11 disclosed in Patent Literature 1, some silicon oxide particles denoted by 17 are situated in the uppermost portion of the film and are connected to a glass sheet 12 via silicon oxide particles 16 situated in the lower portion. The silicon oxide particles 16 and 17 and the glass sheet 12 are firmly fixed together by a binder material. Titanium oxide particles 15 are situated lower than the top portions of the silicon oxide particles 17. Such a film structure is suitable for increasing the film strength and for maintaining the function of the photocatalyst film by preventing detachment of titanium oxide.

CITATION LIST cl Patent Literature

Patent Literature 1: WO 2011/021383 A1

SUMMARY OF INVENTION

Technical Problem

The photocatalyst film disclosed in Patent Literature 1 increases the transmittance of incident light by its reflection-reducing function. However, the amount of the increase as expressed by an average transmittance over the wavelength region from 400 to 1200 nm is only less than 2.0% (Examples shown in Tables 1 and 2 of Patent Literature 1). There is still room for improvement.

The present invention is directed to a glass article including a photocatalyst film containing silicon oxide particles and titanium oxide particles, and aims to further increase the transmittance by improvement of the reflection-reducing function while maintaining the film strength of the photocatalyst film and the photocatalytic function exerted by the titanium oxide particles.

Solution to Problem

The present invention provides a glass article including a glass sheet and a photocatalyst film formed on a surface of the glass sheet. The photocatalyst film contains silicon oxide particles, titanium oxide particles, and a binder material whose main component is silicon oxide. The silicon oxide particles are contained in an amount of 72 to 79 mass %, the titanium oxide particles are contained in an amount of 13 to 18 mass %, and the binder material is contained in an amount of 8 to 14 mass %, with respect to a total amount of the silicon oxide particles, the titanium oxide particles, and the binder material. The silicon oxide particles have an average particle diameter of 30 nm to 200 nm, the titanium oxide particles have an average particle diameter of 5 nm to 20 nm, and the average particle diameter of the silicon oxide particles is five times or more of the average particle diameter of the titanium oxide particles. Assuming that the photocatalyst film has a film thickness T, 80% or more of the titanium oxide particles are present between the surface of the glass sheet and a position spaced from the surface by 0.6 T toward a surface of the photocatalyst film in a thickness direction of the photocatalyst film.

Advantageous Effects of Invention

According to the present invention, in a glass article including a photocatalyst film containing silicon oxide particles and titanium oxide particles, a further increase in transmittance can be achieved while maintaining the film strength of the photocatalyst film and the photocatalytic function exerted by the titanium oxide particles.

BRIEF DESCRIPTION OF DRAWINGS

FIG. 3(a) shows a state after application of a coating liquid, FIG. 3(b) shows a state during volatilization of a liquid component of the coating liquid, and FIG. 3(c) shows a state after volatilization of all of the liquid component.

FIG. 4(a) shows a state after application of a coating liquid, FIG. 4(b) shows a state during volatilization of a liquid component of the coating liquid, and FIG. 4(c) shows a state after volatilization of all of the liquid component.

DESCRIPTION OF EMBODIMENTS

Hereinafter, embodiments of the present invention will be described with reference to the drawings.

Figure 1:
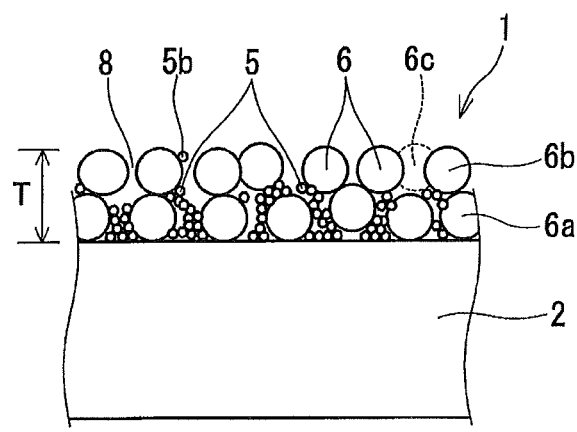
FIG. 1 is a cross-sectional view showing an example of a glass article of the present invention.

In the embodiment shown in FIG. 1, a photocatalyst film 1 formed on a glass sheet 2 contains titanium oxide particles 5 and silicon oxide particles 6. The titanium oxide particles 5 are added for expression of a photocatalytic function, and the silicon oxide particles 6 are added mainly for the purpose of decreasing the refractive index of the film. The photocatalyst film 1 has a reflection-reducing function of decreasing reflection of light incident on the glass sheet 2.

Although not shown in the drawings, a binder material whose main component is silicon oxide is also contained in the photocatalyst film 1. In the present description, the "main component" means a component whose content is the largest in terms of mass. The binder material is present on the surfaces of the particles or at contact portions between the particles themselves or between the particles and the glass sheet, and serves to increase the binding force between the particles themselves or between the particles and the glass sheet at the contact portions.

Particles conventionally used for forming a photocatalyst film can be used as the particles (titanium oxide particles 5 and silicon oxide particles 6) constituting the photocatalyst film 1 without particular limitation. The particles 5 and 6 are selected so that the average particle diameter of the silicon oxide particles 6 is five times or more, for example 6 to 20 times, or preferably 6 to 10 times of the average particle diameter of the titanium oxide particles 5. When there is such a difference between the average particle diameters, the titanium oxide particles 5 can easily enter voids of the film 1, specifically voids between the particles 6 and narrow voids between the particles 6 and the glass sheet 2.

Assuming that three silicon oxide particles having the same perfect spherical shape are arranged in a single layer in closest packing so that each particle is in contact with the other two particles on a plane, then the particle diameter of titanium oxide particles that can enter the spaces between these three silicon oxide particles is about 0.155 times of the particle diameter of the silicon oxide particles (the particle diameter of the silicon oxide particles is about 6.5 times of the particle diameter of the titanium oxide particles). Actually, however, it cannot be that the silicon oxide particles 6 are placed in closest packing. Therefore, in practice, when the average particle diameter ratio is at least about 5 as mentioned above, the titanium oxide particles 5 can fully enter the spaces between the silicon oxide particles 6 or the spaces between the particles 6 and the glass sheet 2, although, as a matter of fact, it is preferable that the average particle diameter of the silicon oxide particles 6 be 6.5 times or more of the average particle diameter of the titanium oxide particles 5.

The average particle diameter of the silicon oxide particles 6 is 30 nm or more and 200 nm or less, and preferably 50 nm or more and 150 nm or less. When the average particle diameter of the silicon oxide particles 6 is too large, it may happen that the reflection-reducing function is decreased and the haze ratio (cloudiness) of the photocatalyst film 1 is excessively increased. On the other hand, when the average particle diameter of the silicon oxide particles 6 is too small, it is difficult to ensure a large ratio relative to the average particle diameter of the titanium oxide particles 5.

The average particle diameter of the titanium oxide particles 5 is preferably 5 nm or more and 20 nm or less, and more preferably 5 nm or more and 15 nm or less. When the average particle diameter of the titanium oxide particles 5 is too large, it is difficult to allow the ratio relative to the average particle diameter of the silicon oxide particles 6 to fall within a desired range. In addition, when the average particle diameter of the titanium oxide particles 5 is too large, it may happen that a large surface area per unit mass of the titanium oxide is not ensured and the photocatalytic function is decreased. On the other hand, when the average particle diameter of the titanium oxide particles 5 is too small, it may happen that the titanium oxide particles are aggregated during preparation of a coating liquid for forming a film, and a homogeneous coating liquid is not obtained.

Here, the method employed in the present description for calculating the average particle diameter of the particles in the film will be described. The average particle diameter is determined by observing a cross-section of the photocatalyst film 1 with a SEM at a magnification of 50,000 to 500,000. Specifically, the longest diameter and the shortest diameter of each of arbitrarily-selected 50 particles the whole of which can be observed are measured, the average value of the longest diameter and the shortest diameter is obtained as the particle diameter of the particle, and the average value of the thus-obtained particle diameters of the 50 particles is determined as the average particle diameter.

It is desirable that both the titanium oxide particles 5 and the silicon oxide particles 6 have uniform particle diameters. The particle diameters of all of the titanium oxide particles 5, as expressed by measured values based on the above-described SEM observation, are preferably in the range of 2 nm to 50 nm and particularly preferably in the range of 5 nm to 20 nm. The particle diameters of all of the silicon oxide particles 6, as expressed by measured values based on the above-described observation, are preferably in the range of 20 nm to 250 nm and particularly preferably in the range of 50 nm to 150 nm. It is preferable that all of the titanium oxide particles 5 and the silicon oxide particles 6 have a substantially spherical shape. The substantially spherical shape means a shape in which a ratio (longest diameter/shortest diameter) between the longest diameter and the shortest diameter as expressed by measured values based on the above-described observation is in the range of 1.0 to 1.5. The use of particles having the substantially spherical shape makes it easier to ensure voids between the particles.

The exact value of a film thickness T of the photocatalyst film 1 can be determined by observing a cross-section of the film with a SEM as in the case of the average particle diameter. Specifically, a cross-section of the photocatalyst film 1 is observed with a SEM at a magnification of 50,000, the film thicknesses at twenty positions spaced from each other by 100 nm in a direction parallel to the surface of the glass sheet 2 are measured, and the average value of the measured thicknesses is determined as the film thickness T. The film thickness T ranges preferably from 20 nm to 500 nm, more preferably 50 nm to 300 nm, and particularly preferably 70 nm to 280 nm. In an actual cross-section of the film, silicon oxide particles 6c are present behind voids 8 present between the silicon oxide particles 6b of the uppermost layer, although all of the silicon oxide particles 6c are not shown in FIG. 1. Therefore, variation in measured values of the film thicknesses at the above-described positions is considerably smaller than expected only based on the silicon oxide particles 6b shown in FIG. 1.

In the photocatalyst film 1, 80% or more, preferably 90% or more, or more preferably 95% or more, of the titanium oxide particles 5 are present between the surface of the glass sheet 2 and a position spaced from the surface by 0.6 T in the thickness direction of the film or, in other words, in a region from the surface of the glass sheet 2 to 60% of the film thickness T of the photocatalyst film 1. The proportion can be determined by observing a cross-section of the film with a SEM and counting the number of the particles. In a more preferred embodiment of the photocatalyst film 1, 80% or more, preferably 90% or more, or more preferably 95% or more, of the titanium oxide particles 5 are present between the surface of the glass sheet and a position spaced from the surface by 0.5 T in the thickness direction of the film.

A very large proportion of the titanium oxide particles 5 are locally present in the lower portion of the photocatalyst film 1. By virtue of this characteristic distribution, the reflection-reducing function of the photocatalyst film 1 can be improved, and thereby the transmittance can be further increased. The fact that the refractive index of the photocatalyst film 1 in the film thickness direction is high in the lower portion of the film and low in the upper portion of the film is thought to contribute to the increase in transmittance. In addition, the structure in which the titanium oxide particles 5 are localized in the lower portion of the photocatalyst film 1 is advantageous also in reducing color unevenness of light reflected by the photocatalyst film 1.

The local presence of the titanium oxide particles 5 in the lower portion of the photocatalyst film 1 permits the upper portion of the photocatalyst film 1 to function as a low-refractive index layer. The refractive index of this layer is further smaller than the refractive index of silicon oxide due to the presence of the voids 8 between the silicon oxide particles 6. This low-refractive index layer contributes to reducing the visible-light reflectance of the photocatalyst film compared with that of a film in which the titanium oxide particles 5 are randomly distributed in the film thickness direction.

The optical effect of decreasing the visible-light reflectance, which is provided by the presence of the low-refraction layer, is not diminished even when a slight amount of titanium oxide particles 5b are present in the upper portion of the film. Therefore, for optical property improvements such as elimination of color unevenness, it is not necessary that the positions of all of the titanium oxide particles be strictly controlled, but it is sufficient that the positions of a large proportion (80% or more) of the titanium oxide particles be adjusted.

In the photocatalyst film 1 of the present embodiment, the silicon oxide particles 6 are arranged in two layers. The number of layers of the silicon oxide particles 6 is not particularly limited, but is preferably 1 to 5 and particularly preferably 2 to 3. The number of layers as mentioned herein is a numerical value determined by the ratio of the film thickness T of the photocatalyst film to the average particle diameter of the silicon oxide particles 6.

In the photocatalyst film 1 of the present embodiment, the first layer in contact with the glass sheet 2 functions as a high-refractive index layer containing silicon oxide particles 6a and the titanium oxide particles 5, while the second layer which is the uppermost layer is constituted substantially by the silicon oxide particles 6b and the voids 8 present between the particles 6b, and functions as a low-refractive index layer containing a tiny amount of titanium oxide particles. As a matter of course, a single or two or more intermediate layers may be provided between the first layer and the second layer so that the photocatalyst film 1 is composed of three or more layers.

The silicon oxide particles 6b constituting the second layer are not in direct contact with the glass sheet 2, and are fixed to the glass sheet 2 via the silicon oxide particles 6a constituting the lower layer(s) (the first layer alone in FIG. 1). Although the titanium oxide particles 5 are present between the glass sheet 2 and a very small proportion of the silicon oxide particles 6a constituting the first layer, a large proportion of the silicon oxide particles 6a are in contact with the surface of the glass sheet 2. The binder material is present between the silicon oxide particles 6a and 6b and between the silicon oxide particles 6a and the glass sheet 2, and reinforces the framework (silicon oxide framework) of the film that is constituted by these particles 6a and 6b.

The titanium oxide particles 5, which are relatively small, enter and reside in the internal voids of the film framework formed by the silicon oxide particles 6 which are relatively large. Thus, a large proportion of the titanium oxide particles 5 are distributed on the film framework composed of the silicon oxide particles 6 at positions that are less directly subject to stresses externally applied to the film. In the photocatalyst film 1, 50% or more of the titanium oxide particles 5 come into and reside in the voids between the silicon oxide particles 6a constituting the first layer or between the particles 6a and the glass sheet 2. With the titanium oxide particles 5 being present in the voids of the inside of the film, the entire structure of the photocatalyst film 1 is made dense. When the film is densified, the durability against externally-applied stresses is increased, and the color unevenness of the film tends to be reduced. Furthermore, the fine titanium oxide particles 5 may aggregate and thus become more likely to express their photocatalytic function.

Figure 2:
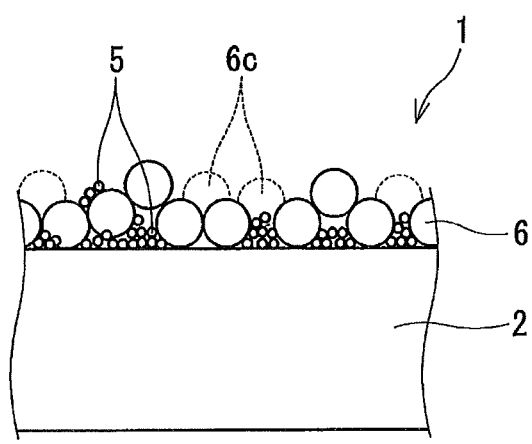
FIG. 2 is a cross-sectional view showing another example of the glass article of the present invention.

A glass article according to another embodiment of the present invention is shown in FIG. 2. Also in this embodiment, the thickness of the film 1 is determined by measuring thicknesses including the silicon oxide particles 6c present at the back of the cross-section of the film. In this embodiment, the thickness of the photocatalyst film 1 is smaller than in the embodiment shown in FIG. 1, and the number of layers of silicon oxide is much smaller than 2. In the glass article of the present invention, the photocatalyst film 1 may have a thicker portion like in FIG. 1, and have a thinner portion like in FIG. 2.

Silicon oxide is suitable as the binder material of the photocatalyst film 1. In particular, a binder made of silicon oxide is highly compatible with the silicon oxide particles 6 and the glass sheet 2, and is suitable for reinforcing the film framework composed of the silicon oxide particles. In addition, a binder made of silicon oxide has a low refractive index, and is thus advantageous for expression of the reflection-reducing function by the photocatalyst film 1.

It is recommended that a hydrolyzable silicone compound as typified by silicon alkoxide be used as a source of the binder made of silicon oxide. Examples of the silicon alkoxide include silicon tetramethoxide, silicon tetraethoxide, and silicon tetraisopropoxide. Any compound known to be capable of forming silicon oxide by a sol-gel process can be used as the binder source without particular limitation.

In the total amount of the silicon oxide particles, the titanium oxide particles, and the binder material in the photocatalyst film 1, the proportion of the silicon oxide particles may be 72 to 79 mass %, the proportion of the titanium oxide particles may be 13 to 18 mass %, and the proportion of the binder material may be 8 to 14 mass %.

The proportion of the silicon oxide particles is preferably 73 to 78 mass %. The proportion of the titanium oxide particles is preferably 14 to 18 mass %. The proportion of the binder material is preferably 8 to 13 mass %.

When the amount of the silicon oxide particles is too large, the photocatalytic function is decreased due to the insufficiency of the titanium oxide particles or the film strength is decreased due to the insufficiency of the binder material. When the amount of the silicon oxide particles is too small, the film strength is decreased or the reflection-reducing function is decreased. When the amount of the titanium oxide particles is too large, the reflection-reducing function is decreased or the film strength is decreased. When the amount of the titanium oxide particles is too small, sufficient photocatalytic function is not obtained. When the amount of the binder material is too large, it may happen that the binder material covers a portion where the titanium oxide particles are aggregated in a porous form, thus decreasing the photocatalytic function. When the amount of the binder material is too small, sufficient film strength is not obtained.

The photocatalyst film 1 can be formed by a sol-gel process using a forming solution (coating liquid) containing silicon oxide particles, titanium oxide particles, and a binder source.

It is preferable that an organic solvent having a boiling point of 190° C. or higher and being miscible with water (a high-boiling-point aqueous-organic solvent) be added to the coating liquid. This solvent remains on the glass sheet 2 for a long time in the course of volatilization of the liquid component of the coating liquid applied onto the glass sheet 2. Therefore, the time for the titanium oxide particles 5 to settle to a lower portion in the applied coating liquid is easily ensured. It is preferable that the vapor pressure of the high-boiling-point aqueous-organic solvent at around ordinary temperature is low. The preferred vapor pressure is less than 10 Pa at 20° C. Examples of high-boiling-point organic solvents that meet this requirement include ethylene glycol (boiling point: 190° C., vapor pressure: 7 Pa (20° C.)). In some conventional cases, propylene glycol (boiling point: 188° C., vapor pressure: 11 Pa (20° C.)) is added to a coating liquid for the purpose of preventing a film being peeled after film formation. However, the addition of propylene glycol cannot allow the titanium oxide particles 5 to settle out sufficiently.

Another material preferably added is a surfactant. The addition of a surfactant makes it easier for the titanium oxide particles to enter the voids of the film. Preferred surfactants are silicone surfactants and fluorine surfactants. Particularly preferred are silicone surfactants.

The preferred concentration of the high-boiling-point aqueous-organic solvent in the coating liquid is about 5 to 15%, and particularly about 10 to 15% in terms of mass. The preferred concentration of the surfactant in the coating liquid is about 0.001 to 0.03%, and particularly about 0.0025 to 0.02%.

Figure 3:
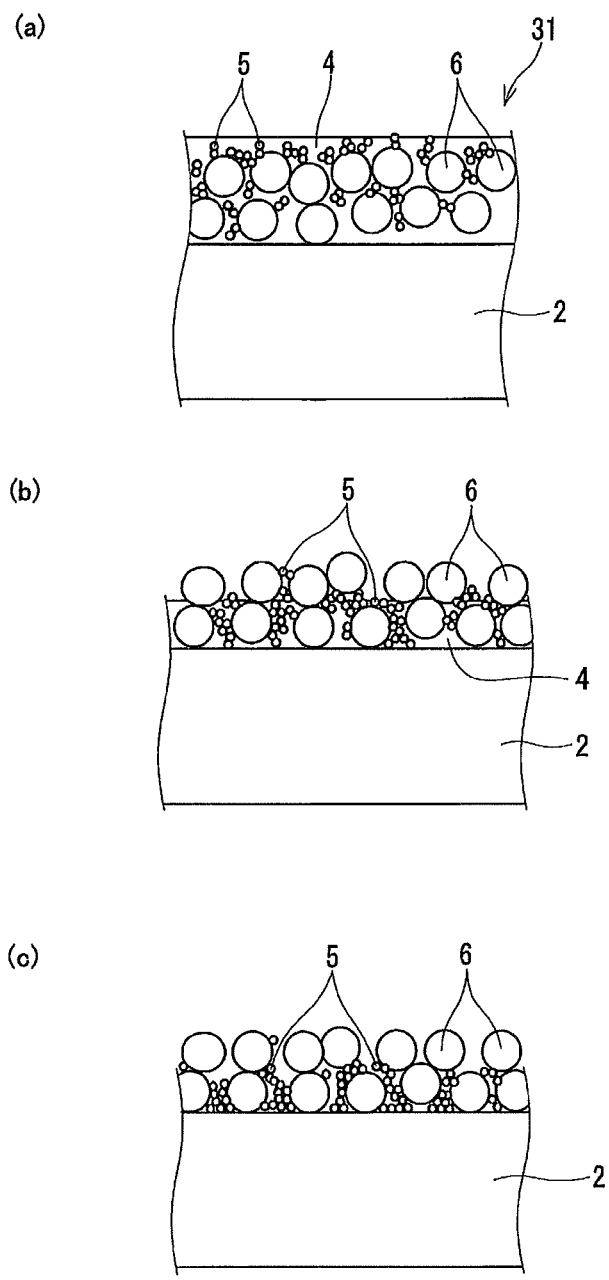
FIG. 3 is a process diagram showing an example of a production method of the glass article of the present invention, where
Figure 4:
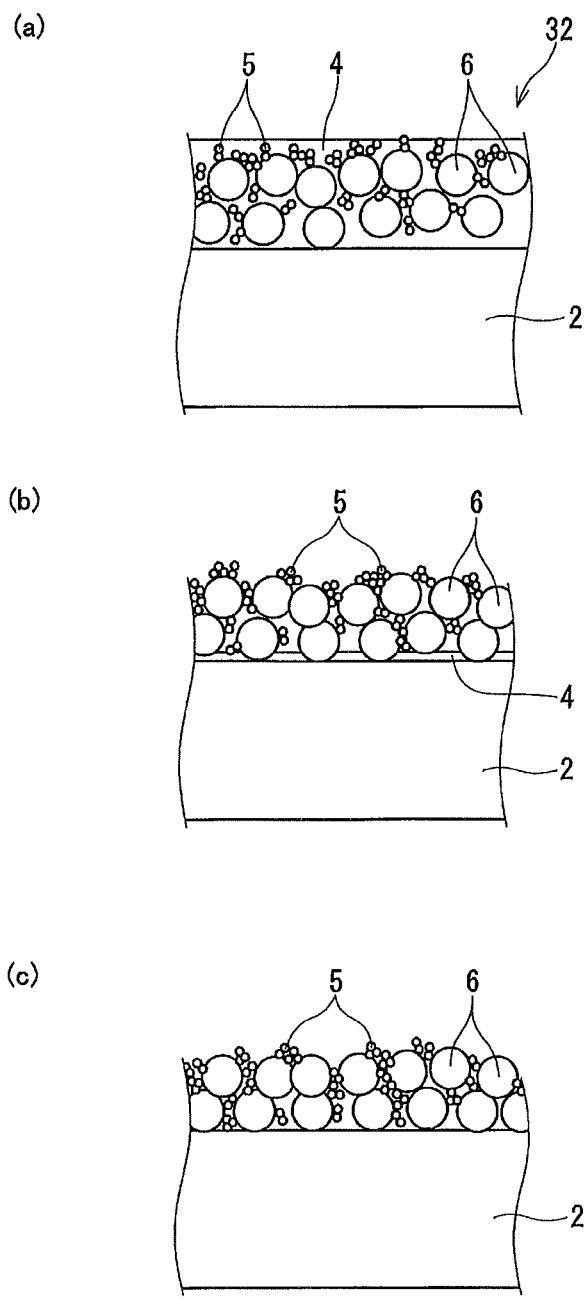
FIG. 4 is a process diagram showing an example of a production method of a conventional glass article, where

The relation between the volatilization of the liquid component of the coating liquid and the film structure will be described with reference to FIG. 3 and FIG. 4. A coating liquid 31 or 32 applied includes the titanium oxide particles 5, the silicon oxide particles 6, and a liquid component 4 containing a binder source (FIG. 3(a), FIG. 4(a)). Along with volatilization of the liquid component by heating, the silicon oxide particles 6 which are relatively large contact each other, so that the framework of the film begins to be formed (FIG. 3(b), FIG. 4(b)). When the volatilization of the liquid component 4 proceeds quickly, the titanium oxide particles 5 attach to the surfaces of the silicon oxide particles 6 present in the immediate vicinity because there is not enough time for the titanium oxide particles 5 to settle in the liquid component 4 (FIG. 4(b)). Consequently, a film is formed in which the titanium oxide particles 5 are randomly distributed in the film thickness direction (FIG. 4(c)). On the other hand, when the volatilization of the liquid component 4 proceeds slowly, the titanium oxide particles 5 can settle deep to the vicinity of the glass sheet 2 in the liquid component 4 (FIG. 3(b)). Consequently, a film is formed in which the titanium oxide particles 5 are distributed locally in the lower portion of the film (FIG. 3(c)).

In practice, it is difficult to allow the titanium oxide particles 5 to settle to the lower portion of the film only by controlling the heating temperature and the heating time. This difficulty is thought to be associated with the fact that the heat capacity of the coating liquid thinly applied is considerably smaller than the heat capacity possessed by the glass sheet 2.

Commonly-known products having been used hitherto can be used as the glass sheet 2 without particular limitation. The glass sheet 2 may be a glass sheet having a flat and smooth surface, as typified by float glass, or may be a glass sheet having a surface provided with projections and depressions, as typified by figured glass. A glass sheet having projections and depressions provided by etching or the like of a flat and smooth surface may also be used.

When the glass sheet 2 has an irregular surface having projections and depressions and the photocatalyst film 1 is formed on the irregular surface using the above coating liquid, the film thickness may vary between the depressed areas and the projecting areas (usually, the film is thick at the depressed areas and thin at the projecting areas). However, with the use of the above coating liquid, 80% or a larger proportion of the titanium oxide particles 5 can be distributed locally in the lower portion of the film (the region up to 0.6 T) with respect to the respective film thicknesses T of the depressed areas and projecting areas.

EXAMPLES

Hereinafter, the present invention will be described in more detail with reference to examples. First, the details of tests carried out for evaluating the properties of glass articles (photocatalyst film-coated glass sheets) fabricated in Examples and Comparative Examples will be described.

<Evaluation of Optical Properties>

The light transmittance and the light reflectance of each glass article was measured using a spectrophotometer (UV-3100, Shimadzu Corporation). The surface having the photocatalyst film formed thereon was subjected to the measurement of the reflectance, and the reflectance was measured by allowing light to be incident on the measurement surface in a normal direction and by introducing to an integrating sphere the reflected light directly reflected at an angle of 8°. At this time, the non-measurement surface (surface having no photocatalyst film formed thereon) opposite to the measurement surface was colored black by spray coating in order to eliminate reflected light from the non-measurement surface. The transmittance was measured by allowing light to be incident on the measurement surface and introducing the transmitted light to an integrating sphere, with the non-measurement surface not being colored black. Based on the transmission and reflection spectra thus obtained, the average transmittance and the average reflectance were calculated by averaging over the wavelength range from 400 to 1200 nm. Furthermore, the change in average transmittance caused by the formation of the photocatalyst film was calculated. Specifically, the average transmittance of a glass sheet having no photocatalyst film formed thereon was measured in the same manner as above, and the change in average transmittance caused by the formation of the photocatalyst film was calculated. Furthermore, the appearances of the photocatalyst films were visually observed, and their color unevenness was evaluated. The appearance free from color unevenness was graded as "Good", the appearance having slight color unevenness was graded as "Average", and the appearance having obvious color unevenness was graded as "Poor".

<Adhesion Test>

A coating liquid-applied glass sheet was dried, and the coating film before sintered was subjected to evaluation. The coating film was rubbed gently with a bare finger to observe whether the coating film was peeled from the interface between the coating film and the glass sheet. A coating film that was peeled from the interface was graded as "Poor", and a coating film that was not peeled from the interface was graded as "Good". When the adhesion is good, the handling of a film-coated glass sheet during the production process is easy. It was only this test that was carried out before sintering the film, and the other tests and evaluation were carried out after sintering the film.

<Reciprocating Abrasion Test>

The reciprocating abrasion test (EN-based abrasion test) was performed according to the abrasion test specified in EN Standards 1096-2: 2001. That is, using a plane abrasion tester (DAIEI KAGAKU SEIKI MFG. co., ltd.) produced to be adaptable to the measurement conditions specified in EN-1096-2, a felt rotated at 6 rpm was pressed against the photocatalyst film surface with a force of 4N and was reciprocated 500 times at an average speed of 7.2 m/minute. After this test, the peeling of the film was visually checked. The case where the film was not peeled was evaluated as "a", while the case where a part of the film was peeled was evaluated as "b".

<Evaluation of Photoinduced Hydrophilicity>

Measured was the change in the contact angle of a water droplet on the surface of the photocatalyst film by ultraviolet irradiation. The ultraviolet irradiation was performed by irradiation with black light (main wavelength: 352 nm, 1 mW/cm$^2$) for 20 hours. The contact angle of a water droplet was measured by DropMaster 300 (manufactured by Kyowa Interface Science Co., Ltd.). In advance, the surface of the film before subjected to the ultraviolet irradiation was lightly wiped using ethanol. cl Example 1

An amount of 22.5 g of ethylene glycol ethyl ether (organic solvent, manufactured by Sigma-Aldrich Co., LLC.), 1.1 g of tetraethoxysilane (binder source, KBE-4 manufactured by Shin-Etsu Chemical Co., Ltd.), 12.7 g of a colloidal silica fine particle-dispersed liquid (PL-7 manufactured by FUSO CHEMICAL CO., LTD., solid content concentration: 22.9%, primary particle diameter (average particle diameter): 75 nm, dispersion medium: water), 2.2 g of a titanium oxide fine particle-dispersed liquid (solid content concentration: 30%, primary particle diameter (average particle diameter): 10 nm, dispersion medium: water), and 0.4 g of 1N hydrochloric acid (hydrolysis catalyst), were weighed and put into a glass container. The mixture was stirred in an oven maintained at 40° C. for 8 hours to obtain a high-concentration solution. The solid content concentration in the high-concentration solution was 10%, and the ratio among the mass of the silicon oxide particles (colloidal silica fine particles), the mass of the titanium oxide fine particles, and the mass of the binder material in terms of $SiO_2$ was 75:17:8. Next, 234.8 g of isopropyl alcohol, 26.1 g of ethylene glycol, 0.06 g of a silicone surfactant (CS 3505 manufactured by Momentive Performance Materials Inc.), and 39.0 g of the high-concentration solution were mixed to prepare a coating solution (solution for forming a film). The solid content concentration in the coating solution was 1.3%.

Figure 5:
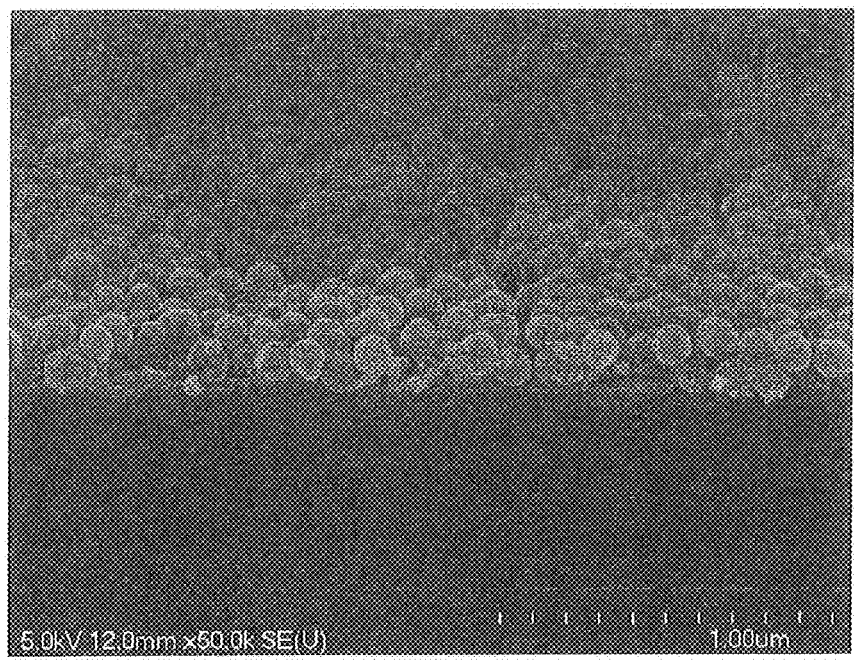
FIG. 5 shows the state of a photocatalyst film obtained by Example 1 as observed with a scanning electron microscope (SEM).
Figure 6:
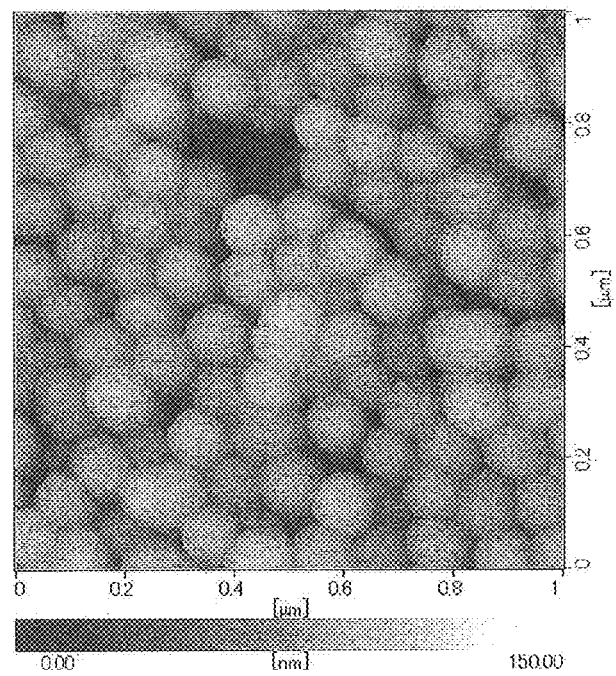
FIG. 6 shows the state of the photocatalyst film obtained by Example 1 as observed with an atomic force microscope (AFM).

Subsequently, the coating liquid was applied by spray coating to an irregular surface of a washed glass sheet (figured glass manufactured by Nippon Sheet Glass Co. Ltd., size: 300 mm×100 mm, thickness: 3 mm). The figured glass used has soda-lime silicate composition, its irregular surface has a profile represented by an arithmetic average roughness Ra of 0.8 μm, a maximum height Ry of 4.5 μm, and a mean spacing Sm of 1100 μm, and the average reflectance evaluated by the method as described above is 4.54%. The coating liquid was continuously stirred until just before the application. The glass sheet to which the coating liquid was applied was dried in an oven set at 400° C., followed by sintering in an electric furnace set at 760° C. for 5 minutes. The photocatalyst film-coated glass sheet thus obtained was evaluated for the above-described properties. The results of the evaluation are shown in Table 1. The added amounts of the materials used for producing the high-concentration solution and the coating liquid, the solid content concentration of the high-concentration solution, and the solid content concentration of the coating liquid, are shown in Table 1. In addition, the state of the formed photocatalyst film observed with a SEM is shown in FIG. 5, while the state of the formed photocatalyst film observed with an AFM is shown in FIG. 6.

Examples 2 to 8 and Comparative Examples 1 to 7

Figure 7:
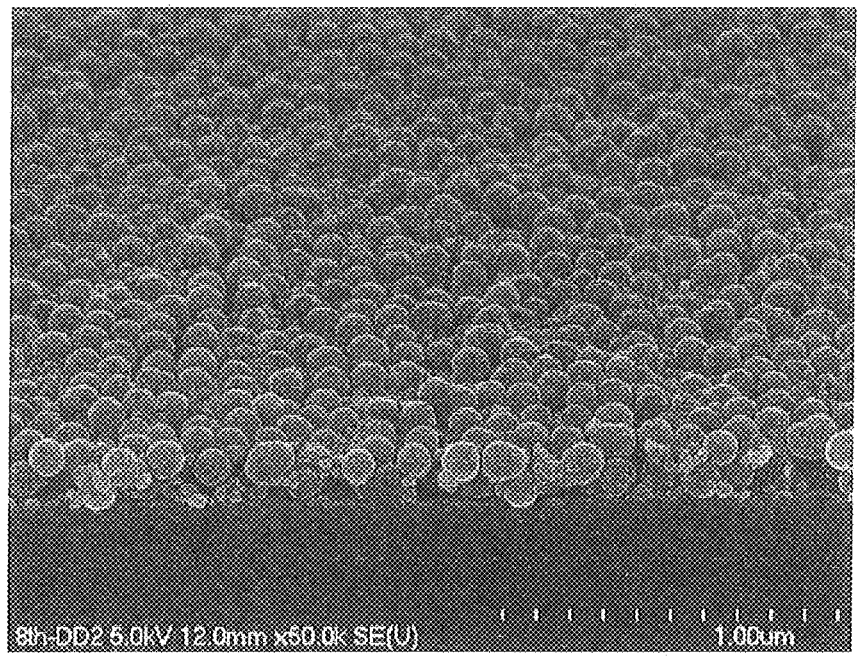
FIG. 7 shows the state of a photocatalyst film obtained by Comparative Example 1 as observed with a SEM.
Figure 8:
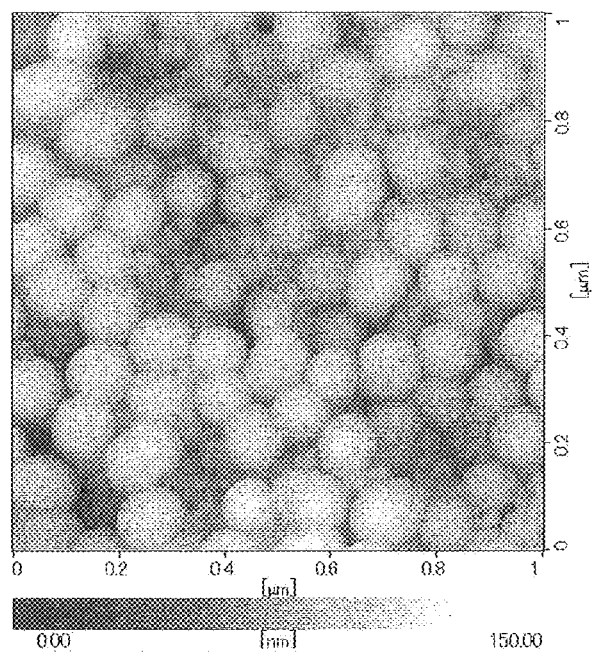
FIG. 8 shows the state of the photocatalyst film obtained by Comparative Example 1 as observed with an AFM.
Figure 9:
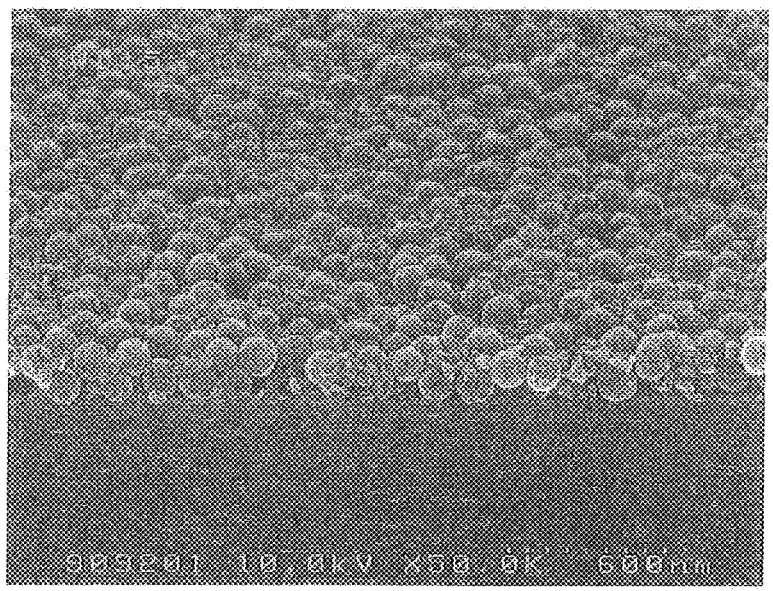
FIG. 9 shows the state of a photocatalyst film obtained by Comparative Example 5 as observed with a SEM.
Figure 10:
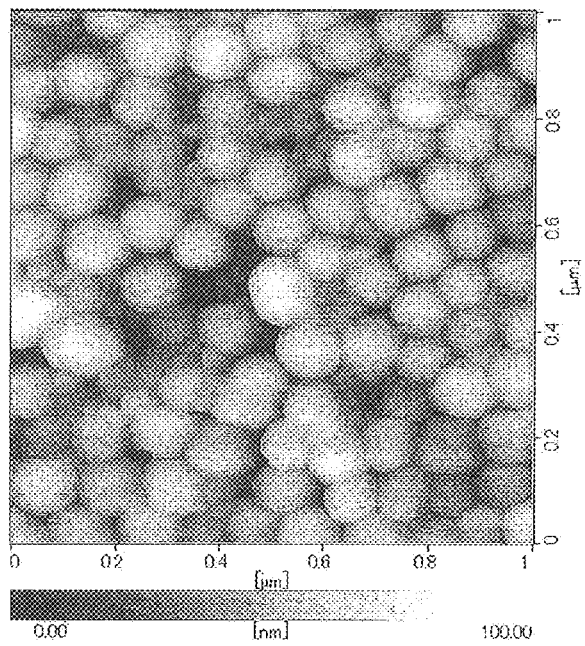
FIG. 10 shows the state of the photocatalyst film obtained by Comparative Example 5 as observed with an AFM.
Figure 11:
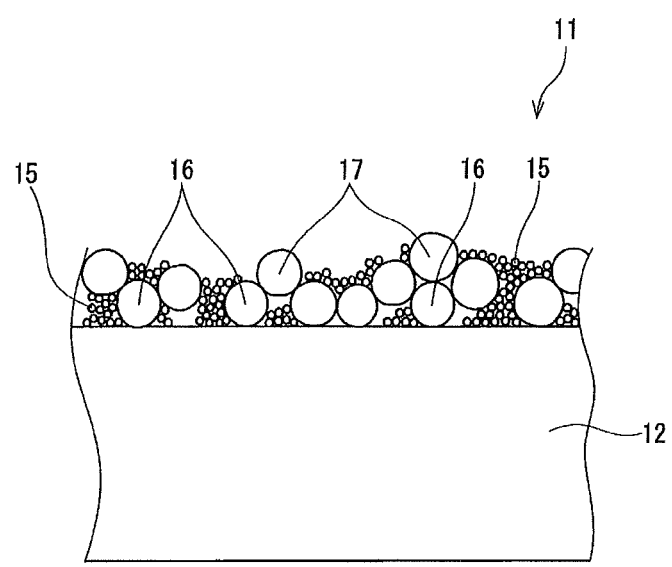
FIG. 11 is a cross-sectional view for illustrating a photocatalyst film disclosed in WO 2011/021383 A1 (Patent Literature 1).

Photocatalyst film-coated glass sheets were obtained in the same manner as in Example 1, except that the amounts of the components of the coating liquid were changed as shown in Table 1. In some Comparative Examples, propylene glycol or 3-methoxybutanol was added to the coating liquids. The results of the evaluation of the above-described properties are shown in Table 1. In addition, the states of the formed photocatalyst films observed with a SEM are shown in FIG. 7 (Comparative Example 1) and FIG. 9 (Comparative Example 5), while the states of the formed photocatalyst films observed with an AFM are shown in FIG. 8 (Comparative Example 1) and FIG. 10 (Comparative Example 5).

By SEM observation of a cross-section of the photocatalyst film-coated glass sheet obtained in each Example, it was confirmed that in the photocatalyst film, 80% or more of the titanium oxide particles were localized in the lower 60% region of the film thickness T (a region from the surface of the glass sheet to 0.6 T). By similar SEM observation of cross-sections of the photocatalyst film-coated glass sheets obtained in Comparative Examples 1, 2, and 5, it was found that in each photocatalyst film, the proportion of the titanium oxide particles present in the lower 60% region of the film was less than 80%.

As shown in Table 1, in each Example, ΔT representing the amount of transmittance increase from the transmittance of the glass sheet alone was not less than 2.0% (actually, not less than 2.2%). In each Example, the film strength of the photocatalyst film was maintained well (both the adhesion and the abrasion resistance were good), and the photocatalytic function exerted by the titanium oxide particles was also maintained well (the contact angle of water was not more than) 5.0°. In addition, the photocatalyst film of each Example was free from color unevenness and had good appearance.

On the other hand, in Comparative Examples 1, 2, and 5, the amount of transmittance increase ΔT was less than 2.0% because a sufficient amount of the titanium oxide particles were not localized in the lower portion of the film (see FIGS. 7 to 10). In these Comparative Examples, propylene glycol (boiling point: 188° C.) or 3-methoxybutanol (boiling point: 161° C.) was added. However, these solvents were not able to provide the same level of effect as obtained by adding a high-boiling-point solvent such as ethylene glycol having a high boiling point and having a sufficiently low vapor pressure at around ordinary temperature. In Comparative Examples 3 and 6, the strength of the film was insufficient due to the too small amount of the binder material. In Comparative Examples 4, 6, and 7, due to the too small amount of the titanium oxide particles, the photocatalytic function of the film was insufficient and the contact angle of water was not decreased. In Comparative Examples 3, 4, 6, and 7, although the amount of transmittance increase ΔT was more than 2.0%, the film strength and/or the photocatalytic function was not sufficient. As for the appearance, color unevenness was observed more or less in the photocatalyst film-coated glass sheets of Comparative Examples.

By SEM observation, it was confirmed that the particle diameters of all of the titanium oxide particles were in the range of 5 nm to 20 nm, the particle diameters of all of the silicon oxide particles were in the range of 50 nm to 150 nm, and all of the titanium oxide particles and silicon oxide particles had a substantially spherical shape. It was also confirmed that the film thickness T of the photocatalyst film in each Example was in the range of 70 nm to 280 nm.

TABLE 1

|  | Example 1 | Example 2 | Example 3 | Example 4 | Example 5 | Example 6 | Example 7 | Example 8 |
|---|---|---|---|---|---|---|---|---|
| $SiO_2$ particles (parts by mass) | 75 | 73 | 73 | 73 | 72 | 79 | 74 | 74 |
| $TiO_2$ particles (parts by mass) | 17 | 17 | 17 | 17 | 16 | 13 | 18 | 15 |
| Binder material (parts by mass) | 8 | 10 | 10 | 10 | 12 | 8 | 8 | 11 |
| Solid content concentration (mass %) | 1.3 | 1.3 | 1.1 | 1.3 | 1.3 | 1.3 | 1.3 | 1.3 |
| Ethylene glycol (mass %) | 10 | 10 | 10 | 10 | 8 | 10 | 12 | 10 |
| Propylene glycol (mass %) | 0 | 0 | 0 | 0 | 0 | 0 | 0 | 0 |
| 3-methoxybutanol (mass %) | 0 | 0 | 0 | 0 | 0 | 0 | 0 | 0 |
| Surfactant   Type | CS3505 | CS3505 | CS3505 | CS3505 | CS3505 | CS3505 | CS3505 | CS3505 |
|   Concentration (mass %) | 0.02 | 0.02 | 0.02 | 0.003 | 0.02 | 0.02 | 0.02 | 0.02 |
| Average transmittance (%; 400-1200 nm) | 93.97 | 93.72 | 94.05 | 94.05 | 93.58 | 94.01 | 93.75 | 93.72 |
| Transmittance difference ΔT from glass sheet (%) | 2.36 | 2.32 | 2.37 | 2.30 | 2.13 | 2.39 | 2.28 | 2.25 |
| Average reflectance (%; 400-1200 nm) | 2.13 | 2.26 | 2.16 | 2.19 | 2.34 | 2.04 | 2.22 | 2.24 |
| Contact angle of water (°) | 3.6 | 4.9 | 4.5 | 4.3 | 4.5 | 5.0 | 3.5 | 4.7 |
| Adhesion | Good | Good | Good | Good | Good | Good | Good | Good |
| Appearance unevenness after sintering | Good | Good | Good | Good | Good | Good | Good | Good |
| Abrasion resistance (EN-based abrasion test) | a | a | a | a | a | a | a | a |

Adhesion/Good: Not peeled, Poor: Peeled

Appearance unevenness/Good: Free from color unevenness, Average: Slight color unevenness, Poor: Obvious color unevenness Abrasion resistance/a: No film peeling, b: Partial peeling

TABLE 2

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| $SiO_2$ particles (parts by mass) | 73 | 73 | 77 | 85 | 70 | 85 | 80 |
| $TiO_2$ particles (parts by mass) | 17 | 17 | 18 | 5 | 15 | 10 | 10 |
| Binder material (parts by mass) | 10 | 10 | 5 | 10 | 15 | 5 | 10 |
| Solid content concentration (mass %) | 1.3 | 1.5 | 1.5 | 1.3 | 1.5 | 1.3 | 1.3 |
| Ethylene glycol (mass %) | 0 | 0 | 0 | 10 | 0 | 0 | 0 |
| Propylene glycol (mass %) | 0 | 5 | 5 | 0 | 5 | 5 | 5 |
| 3-methoxybutanol (mass %) | 10 | 0 | 0 | 0 | 0 | 0 | 0 |
| Surfactant   Type | CS3505 | CS3505 | — | — | CS3505 | — | — |
|   Concentration (mass %) | 0.02 | 0.05 | 0 | 0 | 0.05 | 0 | 0 |
| Average transmittance (%; 400-1200 nm) | 93.06 | 92.86 | 94.12 | 94.13 | 92.83 | 94.25 | 93.98 |
| Transmittance difference ΔT from glass sheet (%) | 1.43 | 1.23 | 2.41 | 2.45 | 1.13 | 2.48 | 2.20 |
| Average reflectance (%; 400-1200 nm) | 2.95 | 3.07 | 2.05 | 2.03 | 3.03 | 1.98 | 2.35 |
| Contact angle of water (°) | 3.0 | 2.8 | 2.5 | 13.5 | 2.8 | 5.2 | 10.5 |
| Adhesion | Good | Good | Poor | Good | Good | Poor | Good |
| Appearance unevenness after sintering | Average | Average | Poor | Poor | Poor | Poor | Poor |
| Abrasion resistance (EN-based abrasion test) | a | a | b | a | a | b | a |

Adhesion/Good: Not peeled, Poor: Peeled

Appearance unevenness/Good: Free from color unevenness, Average: Slight color unevenness, Poor: Obvious color unevenness Abrasion resistance/a: No film peeling, b: Partial peeling

The invention claimed is:

1. A glass article comprising a glass sheet and a photocatalyst film formed on a surface of the glass sheet, wherein
the photocatalyst film contains silicon oxide particles, titanium oxide particles, and a binder material whose main component is silicon oxide,
the silicon oxide particles are contained in an amount of 72 to 79 mass %, the titanium oxide particles are contained in an amount of 13 to 18 mass %, and the binder material is contained in an amount of 8 to 12 mass %, with respect to a total amount of the silicon oxide particles, the titanium oxide particles, and the binder material,
the silicon oxide particles have an average particle diameter of 50 nm to 150 nm, the titanium oxide particles have an average particle diameter of 5 nm to 20 nm, and the average particle diameter of the silicon oxide particles is five times or more of the average particle diameter of the titanium oxide particles,
assuming that the photocatalyst film has a film thickness T, 80% or more of the titanium oxide particles are present between the surface of the glass sheet and a position spaced from the surface of the glass sheet by 0.6 T toward a surface of the photocatalyst film in a thickness direction of the photocatalyst film, and
an amount of transmittance increase $\Delta T$ is 2.13% to 2.39%, the amount of transmittance increase $\Delta T$ being obtained by subtracting an average transmittance in a range of 400 to 1200 nm of the glass sheet having no photocatalyst film formed thereon from an average transmittance in a range of 400 to 1200 nm of the glass article.

2. The glass article according to claim 1, wherein the silicon oxide particles are contained in an amount of 73 to 78 mass %, the titanium oxide particles are contained in an amount of 14 to 18 mass %, with respect to the total amount of the silicon oxide particles, the titanium oxide particles, and the binder material.

3. The glass article according to claim 1, wherein the film thickness T of the photocatalyst film is in a range of 70 nm to 280 nm.

4. The glass article according to claim 1, wherein the photocatalyst film is formed by a method comprising (i) applying a coating liquid to the glass sheet to form a coating film on the glass sheet, (ii) drying the glass sheet to which the coating liquid is applied, and (iii) sintering the coating film,
the coating liquid contains the silicon oxide particles, the titanium oxide particles, and a binder source as a source of the binder material,
the binder source is silicon alkoxide,
the coating liquid includes a high-boiling-point aqueous-organic solvent that is an organic solvent having a boiling point of 190° C. or higher and being miscible with water, and
a concentration of the high-boiling-point aqueous-organic solvent in the coating liquid is 5 to 15% in terms of mass.

5. The glass article according to claim 4, wherein the coating liquid includes a surfactant.

6. The glass article according to claim 1, wherein the photocatalyst film has the film thickness T, 95% or more of the titanium oxide particles are present between the surface of the glass sheet and a position spaced from the surface by 0.5 T toward the surface of the photocatalyst film in the thickness direction of the photocatalyst film.

* * * * *